INVENTOR.
GEORGE R. COURNOYER
BY
Kenyon & Kenyon
ATTORNEYS

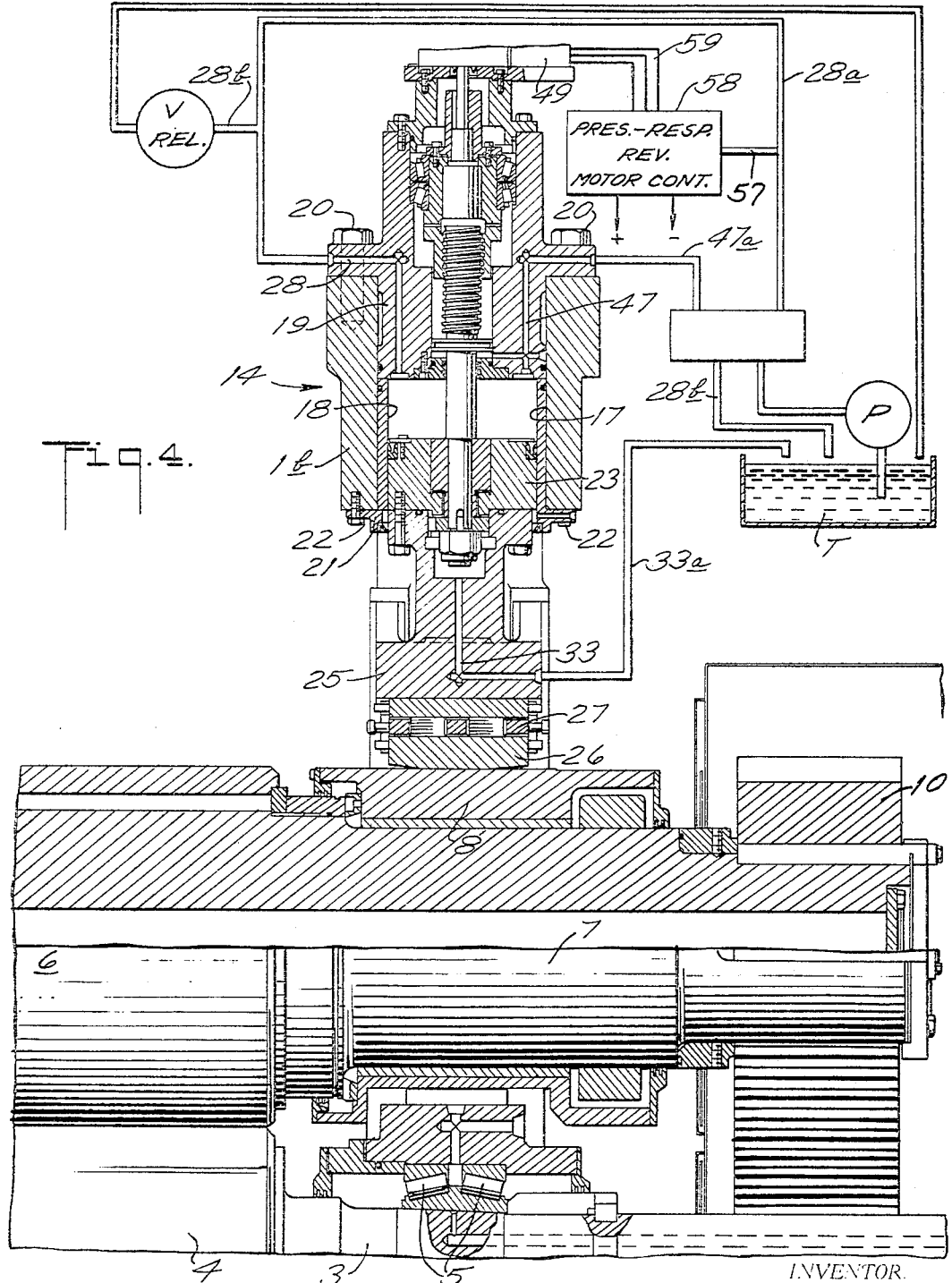

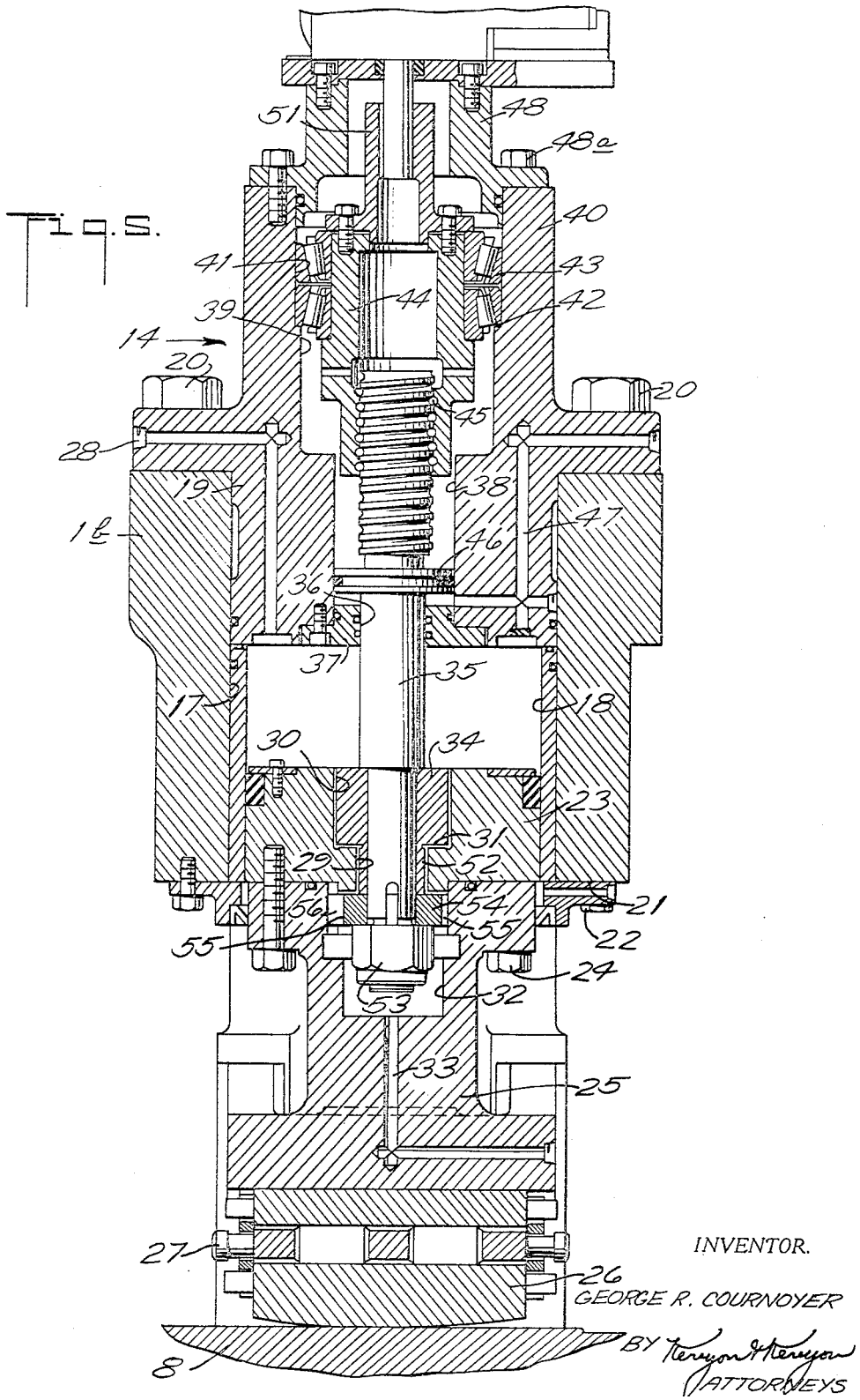

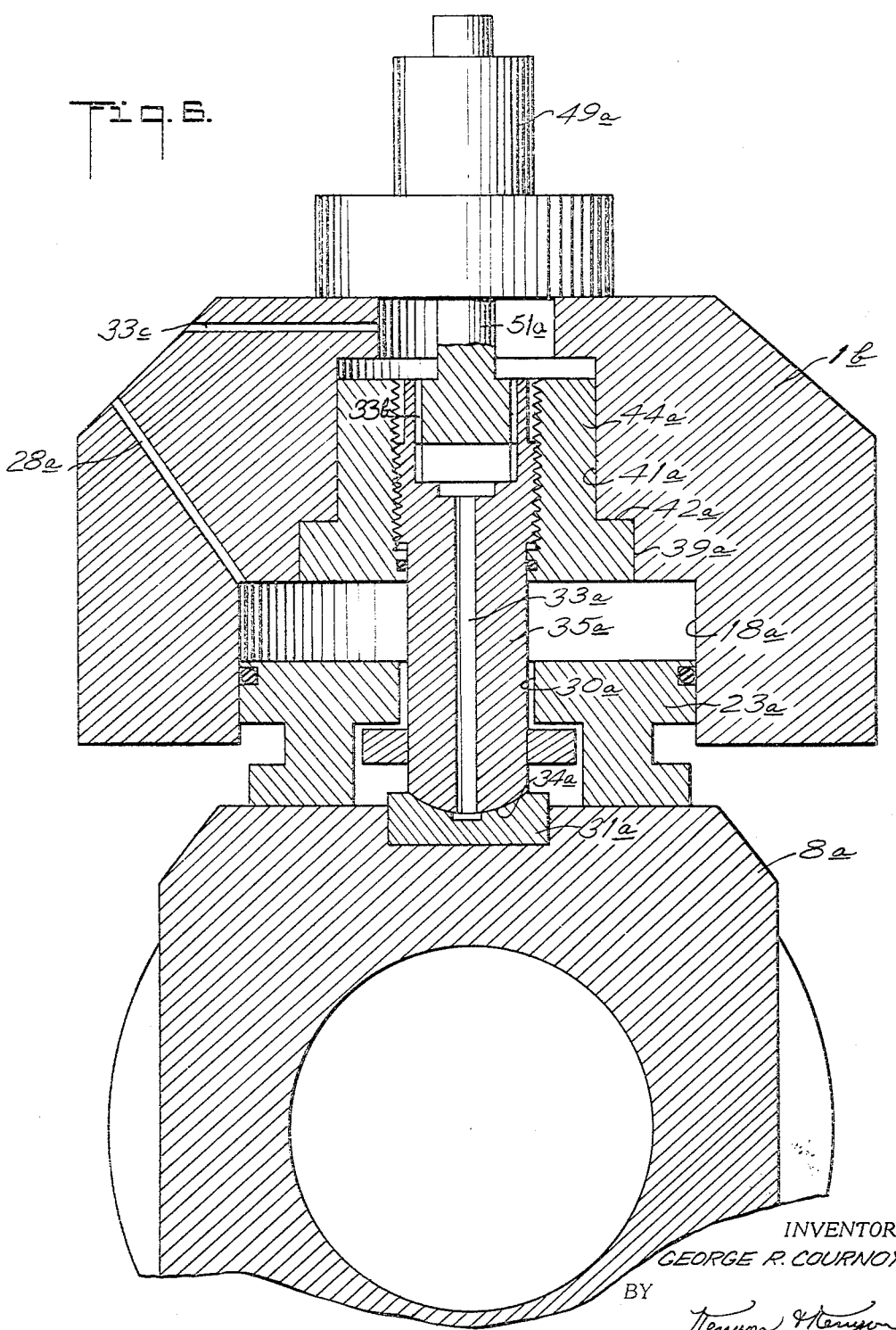

United States Patent Office 3,479,951
Patented Nov. 25, 1969

3,479,951
ROLL POSITIONING MECHANISM
George R. Cournoyer, Huntington, Conn., assignor to USM Corporation, Boston, Mass., a corporation of New Jersey
Filed Aug. 28, 1967, Ser. No. 663,638
Int. Cl. B21b *31/32;* D06f *45/08;* B30b *3/04*
U.S. Cl. 100—170                                9 Claims

ABSTRACT OF THE DISCLOSURE

A calender roll, metal rolling roll or the like, has its opposite ends each positioned by a hydraulic cylinder connected to the roll frame or housing and containing a piston which bears on the roll's bearing. The cylinder has an inlet through which a constant flow of hydraulic pressure liquid is introduced and an outlet through which this liquid is permitted to continuously discharge under the control of a valve or variable flow control gap which is responsive to relative movement of the piston in the cylinder. This valve is adjustably positionable to locate the operating position of the piston and therefore the position of the roll. Other details are also disclosed.

---

Figure 1:
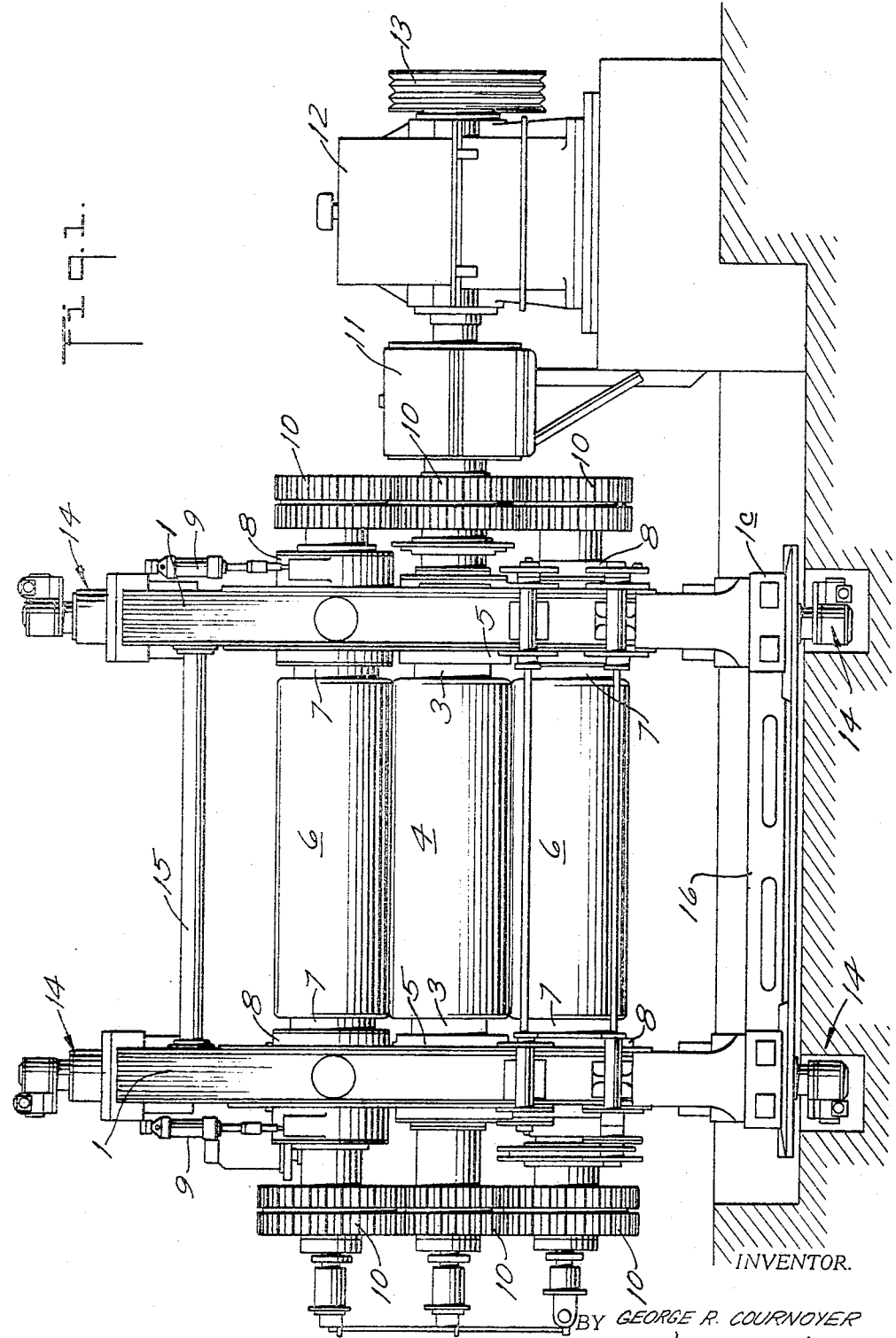

This invention relates to mechanisms for relatively positioning adjustably interspaced work rolls cooperatively forming a pressure-rolling pass for traveling work.

Examples of machines using such rolls are plastic and rubber calenders and calenders in general, metal rolling mills, and the like. All of these include a stack or stand of two or more rolls one of which is journaled by stationary bearings, and the other of which is adjustable because it is journaled by bearings that are movable towards and away from these stationary bearings. The bearings of this adjustable roll require positioning so that the distance of separation between the two rolls, or the roll nip or pass, may be fixed as required for the pressure-rolling operation. The work may be in the form of a web, as in the case of a calender, or a strip, as in the case of a strip metal rolling mill. Some machines use more than two rolls to provide more than two nips or passes. The work traveling between the pressure-rolling rolls in all cases exerts a roll-separating force which often varies in degree and is often very great as in the case of a strip metal rolling mill and many calenders, and in all cases, the roll-separating force must be carried by the mechanisms which adjustably locate the roll bearings to provide the proper size of pass or nip.

Prior art mechanisms have usually taken the form of large and massive screw-downs which include screws and nuts. The nuts are usually fixed to the roll frame or housing which mount the roll bearings. The screws which are in threaded engagement with the nuts are pressed against the adjustable roll bearings. Rotation of these screws to position the roll bearings requires high torque and therefore turning devices with large torque capacity. The result has been to make delicate or minute roll adjustment difficult.

Efforts to substitute hydraulic roll adjusting mechanisms have involved the problem that the high hydraulic pressures have had to be carried by piping made of metal and subject to elastic expansion by the internal hydraulic pressure they must carry. Hydraulic cylinders themselves, also necessarily made of metal and therefore subject to elastic expansion under the hydraulic pressure, have added to the problem. Sometimes air or other gases may be entrapped by the hydraulic pressure liquid. All of these factors have resulted in hydraulic roll adjustment mechanisms introducing an undesirable springiness interfering with delicate and exact roll nip or pass adjustments.

The object of the present invention is to overcome the problems outlined above, to a greater extent than has heretofore been possible.

Briefly summarized, the present invention follows the prior art to the degree that it is a roll adjusting mechanism having a hydraulic cylinder fixed to the machine's frame or housing and a piston which transmits the hydraulic pressure to the adjustable roll bearings. It is to be understood that there will be such a mechanism for each bearing journaling the adjustable roll. Means are provided for feeding hydraulic pressure liquid to the cylinder's inlet to apply the roll bearing pressure.

Contrasting with the prior art, means are provided for feeding a continuous flow of hydraulic pressure liquid to the cylinder's inlet and for permitting a continuous discharge flow of this hydraulic pressure liquid from the cylinder and this discharge flow is restricted or choked to provide hydraulic pressure in the cylinder by a valve means provided with means responsive to relative movement of the piston in the cylinder for controlling this valve means. This is done so as to increase the choking effect when the piston moves against the hydraulic pressure in the cylinder and to decrease the choking effect when the piston moves oppositely. The changes in the choking effect are accompanied by simultaneous increases and decreases in cylinder pressure. The hydraulic pressure in the cylinder will always create a reaction force equal and opposite to the action force transmitted to the piston from the roll separating force. The motion of the piston that causes a change in choking effect and therefore hydraulic pressure in the cylinder is many times smaller than that of a cylinder of comparable size. Therefore the springiness of prior art hydraulic mechanisms is substantially eliminated.

Continuing, the valve controlling means responsive to the relative movement of the piston in the cylinder is adjustable to act as described when the piston is located at various locations within the cylinder, thus permitting adjustment of the roll nip or pass formed by the adjustable roll with its counter roll. The means for effecting this adjustable location requires very little operational force and therefore permits delicate adjustment of the nip or pass.

The inclusion of means responsive to the hydraulic pressure in the cylinder for controlling the above valve means to keep the hydraulic pressure in the cylinder at a substantially constant value results in the important advantage of providing a constant roll pressure-rolling force as contrasted to a roll separation of constant value. With proper mechanical and hydraulic design the invention enables compensation to be made for the effect of the "stretch" or "springiness" of some of the mechanical elements in the roll frame and roll positioning device and thus can eliminate any changes in roll nip gap due to the abovementioned elastic action.

Figure 2:
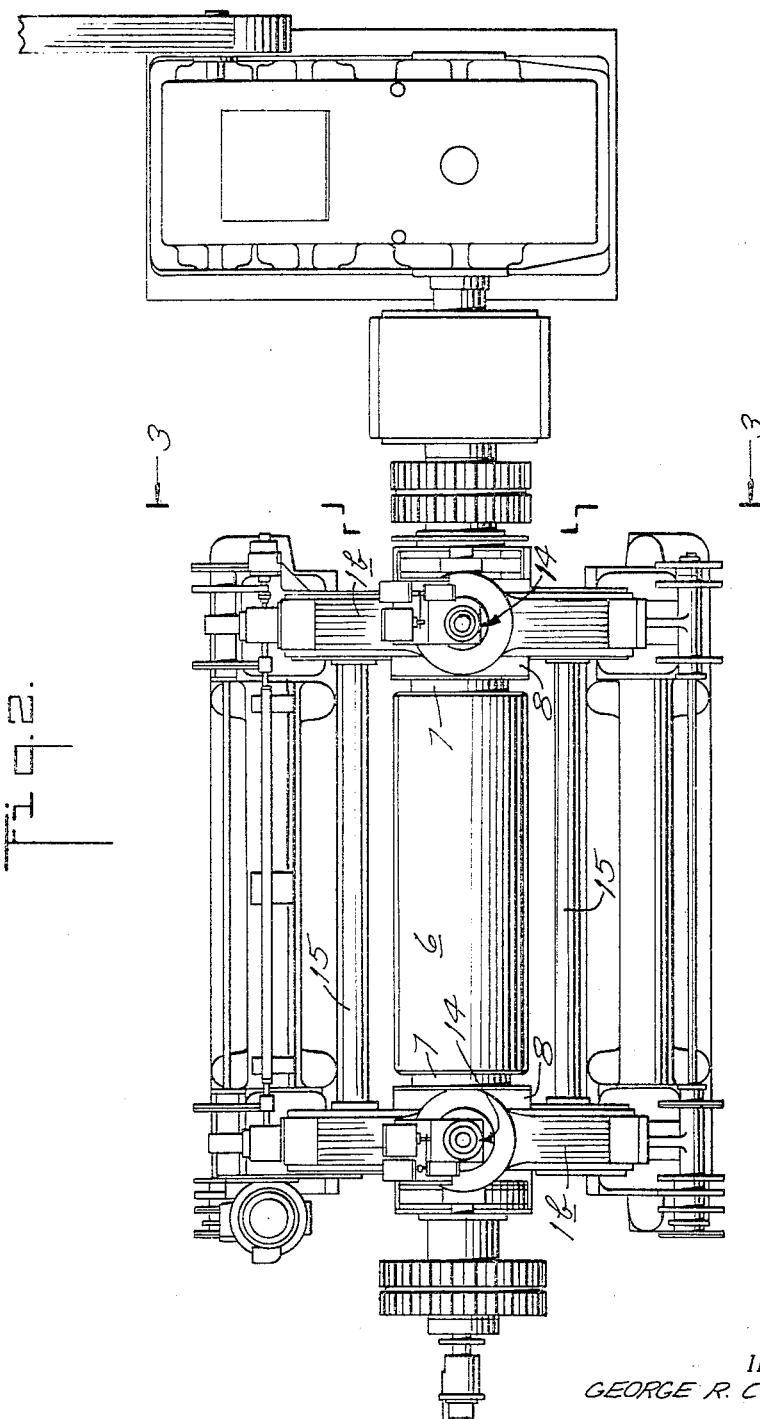
Figure 3:
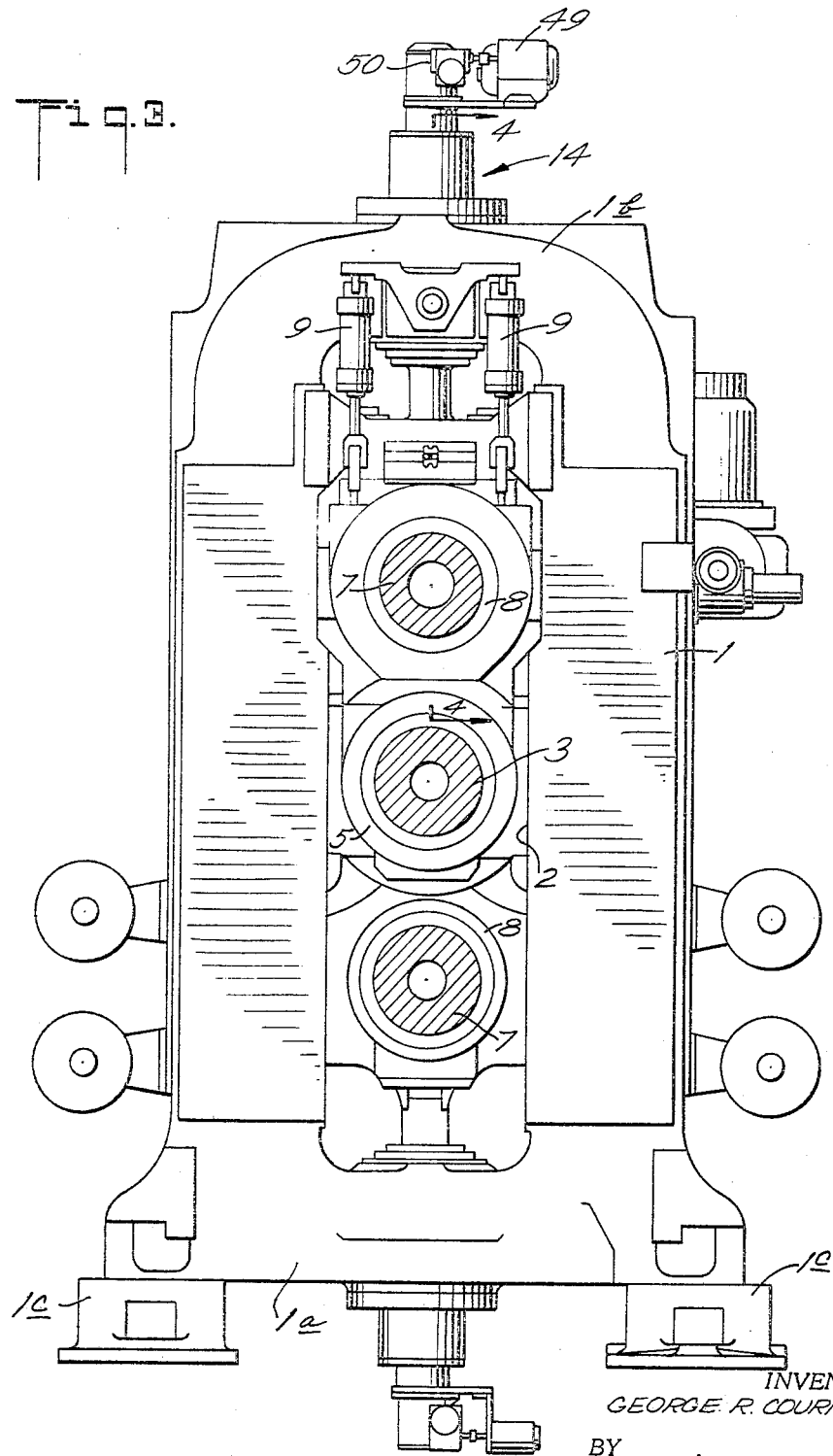

The accompanying drawings illustrate the presently preferred embodiment of the roll adjusting mechanism of this invention applied to a plastic or rubber calender having a three roll stack wherein the middle roll is journaled by stationary bearings and the other two rolls are journaled by adjustable bearings, the calender therefore requiring four roll adjusting mechanisms. In these drawings the various figures are as follows:

FIG. 1 is a side elevation;
FIG. 2 is a top plan;
FIG. 3 is an end elevation, with parts in cross-section taken on the line 3—3 in FIG. 2;
FIG. 4 is a vertical section taken on the line 4—4 in FIG. 3;
FIG. 5 shows the roll adjusting mechanism alone, as in FIG. 4 but on an enlarged scale; and FIG. 6 shows in schematic form a modification of the mechanism shown by FIG. 5.

Referring to these drawings:

This calender shown by FIGS. 1–3 includes laterally interspaced frames 1 having windows 2 in which the roll necks 3 of the middle roll 4 are journaled by stationary bearings 5 which are fixed immovably with respect to the frames 1. The adjustable rolls are the upper and lower rolls 6 which have their roll necks 7 journaled by bearings 8 which are mounted in the windows 2 so that they can move up and down vertically with respect to the frames 1. Hydraulic counterbalances 9 permit lifting of the upper two bearings 8, the lower two bearings 8 being free to lower by gravity. This is to open the nips or passes formed by the roll 4 cooperatively with the upper and lower rolls 6 when required.

The rolls are intergeared by gears 10, keyed to the roll necks of the various rolls, rotative power being provided to the middle roll, and through the gears to the other two rolls. This power is transmitted through a coupling 11 and a speed reduction gear train, in the gear box 12, by means of an unillustrated belt drive and motor, the pulley 13 of this drive however being shown.

Obviously, roll positioning mechanisms are needed for each of the roll neck 8 and these are generally indicated at 14. These mechanisms must position the two rolls against the roll-separating forces of work traveling between the two nips or passes which the two adjustably positioned rolls form with the fixedly positioned roll 4.

The calender's frames 1 are closed-top frames having bases 1a which rest on the calender's supporting shoes 1c, the windows 2 being closed at their tops by the frame tops 1b. The two frames are, of course, vertical and parallel to each other, the frames being integrated by means of tie rods 15 at their tops and separators 16 at their bottoms.

The upper two of the mechanisms 14 have their hydraulic cylinders 17 cast as parts of the frame tops 1b, the cylinder for the lower two mechanisms being formed by appropriately casting the frame bases 1a. All four mechanisms are the same and therefore it is to be understood that the following detailed description of one mechanism applies to all four.

Referring now to FIGS. 4 and 5 in particular, and using one of the upper roll adjusting mechanisms for disclosure purposes, the cylinder formed by the cast frame top 1b is machined cylindrically internally and provided with a cylindrical liner 18 held in position by a cylinder head 19 secured to the cylinder casting by cap screws 20 and engaging the top of the liner 18, and by a closure plate 21 secured to the bottom of the cast cylinder by cap screws 22 and engaging the bottom of the liner. A piston 23 reciprocates within the liner 18 and is connected by cap screws 24 with a chock 25 which transmits pressure to that one of the roll neck bearings 8 with which this particular mechanism is associated, through the medium of a bearing assembly including a rocker plate 26 and a liner roller bearing 27. The purpose of this bearing assembly is to permit the application of pressure from the chock 25 to the bearing 8 without undesirable lateral binding action due to possible misalignment of the parts.

The cylinder head 19 which together with the cylinder 18 and the other parts provides a closed end portion for the cylinder, is formed with a hydraulic pressure liquid inlet 28 which leads to the space inside this enclosed end portion. With the development of hydraulic pressure in the cylinder's enclosed end portion above the piston 23, the latter is forced downwardly and through the medium of the chock 25 and bearing assembly 26 applies pressure to the bearing 8 to react against the roll-separating force exerted by work passing between the upper roll 6 and the roll 4.

As so far described, there is the old combination comprising the adjustably interspaced work rolls, which is the roll 4 and the upper roll 6, cooperatively forming a pressure-rolling pass for traveling work between them. There is a cooperating cylinder 18 and piston 23 normal or at right angles to and on one side of one roll opposite to this pressure-rolling pass, this roll being the upper one of the rolls 6. The chock 25 and bearings 26 function as a compression member connecting one end of this piston to the upper roll. The cylinder 18 has the closed end portion enclosing the other end of the piston because of the cylinder head 19. Finally, the frame 1 acts as a tension member interconnecting the cylinder 18, this being the liner anchored in the frame top 1b providing the cylinder wall thickness required for high pressure work, and the roll 4, because its bearings 5 are connected to the frame 1, so that hydraulic pressure in the cylinder's closed end portion, above the piston 23, provides a reaction to the roll-separating force of the work.

As previously indicated, prior art combinations of this kind have introduced an undesirable springiness in the roll positioning action. To avoid this effect, mechanical screw-down mechanisms are commonly used but involve the problems previously outlined.

Therefore, this new mechanism has the piston 23 formed with a bore 29 extending upwardly from its bottom and interconnecting with a counter bore 30 extending downwardly from the top of the piston, the bottom of the counter bore forming a flat seat 31. The chock 25 is formed with a blind bore 32 and is drilled to provide an outlet passage 33.

Reference to FIG. 4 shows a continuous delivery pump P which can deliver hydraulic pressure liquid through a pipe 28a to the inlet 28, but that as the mechanism has been described so far, no hydraulic pressure can develop in the cylinder 18 because the bores 29 and 30, the bore 32 and the discharge passage 33, permit continuous discharge of the liquid through a pipe 33a to a tank T from which the pump P draws its liquid.

Continuing, such free loss of hydraulic pressure liquid from the cylinder 18 is prevented by a valve head 34 fixedly positioned on a rod 35 which extends upwardly through a sealed opening 36 in the cylinder head 19. This opening is formed in a cylinder head insert 37 of small piston area enclosing a cylindrical bore 38 extending upwardly in the cylinder head 19. The cylinder head thus is annular and provides a large mass of metal where it is needed because of the inside of the cylinder head presenting a large piston area to the hydraulic pressure in the cylinder. This bore 38 continues upwardly and joins with a counter bore 39 formed by an upstanding extension 40 of the cylinder head 19, where the bore 38 joins with a second and larger counter bore 41 forming a shoulder 42 with the counter bore 39. A tapered roller bearing 43 rests downwardly on the shoulder 42 and can slide upwardly therefrom in the bore 41, and this bearing 43 journals a rotative nut 44 in screw-threaded engagement with the upper end of the rod 35. The rod's threads and the threads of the nut 44 engage each other through running balls 45 to reduce the torque required to turn the nut 44. Rotation of this nut adjusts the location of the valve head 34 relative to the cylinder 18.

Now, as the mechanism has been described so far, the discharge of the hydraulic pressure liquid from the cylinder 18 must be through the space formed between the valve head 34 and the piston's bore 30, this valve head being in effect a cylindrical collar of slightly less outside diameter than the diameter of the bore 30, and through the space between the bottom face of this valve head and the seat 31.

Thus a flow control gap is formed between the bottom of the valve head and the seat 31 in the piston 23. Therefore, with hydraulic pressure liquid continuously introduced to the cylinder's closed end portion through the inlet 28, hydraulic pressure builds up in the cylinder 18 to provide the necessary reaction to the roll-separating force transmitted to the piston 23 through the roll bearing 8, the bearing assembly 26 and the chock 25. If the pressure above the piston 23 becomes greater, the piston moves downwardly but the space between the valve head 34 and the seat 31 opens slightly so that the control gap becomes larger, with the result that the hydraulic pressure in the cylinder drops. If the pressure drops lower than required to provide the proper reaction, the piston 23 rises and the control gap becomes smaller so that the pressure above the piston increases. Depending on the location of the valve head 34, as adjusted by the nut 44, the location of the piston 23 and therefore of the upper roll is positively fixed. The previously described springy effect is essentially eliminated because the necessary motion of piston 23 required to effect a change in hydraulic pressure is many times smaller than the corresponding motion of a conventional piston and cylinder of comparable size. The pump P must of course deliver a minimum pressure as required to meet the maximum roll-separating force expected, and preferably it should be capable of delivering a substantially greater pressure. This is because it is desired to maintain a continuous flow through the inlet 28 in the cylinder 18 and a continuous discharge flow in the manner described. Also, the pump should have adequate delivery volume capacity. If these conditions are met the control gap through which the hydraulic pressure liquid discharges from the cylinder 18 never closes fully and the mechanism operates as intended.

The illustrated mechanism also provides for complete roll separation as required at the start of pressure-rolling operations, for roll changing and the like. Thus the bore 38 in the cylinder head 19 is finished as a hydraulic cylinder and the rod 35 above the cylinder head insert 37 has a piston 46 fixed to it. This piston 46 is close to the insert 37 when the bearing 43 is resting on the shoulder 42 which it does because the upper surface of the valve head 34 is exposed to hydraulic pressure which results in a greater hydraulic force on the upper surface than the hydraulic force on the lower surface of the valve head so that this rod 35 is under tension during normal operating conditions. The cylinder head 19 is drilled to provide a passage 47 opening to the portion of cylinder 38 below this piston 46.

Now, referring to FIG. 4 again with the pump P continuously delivering its pressure liquid through a distributing valve V the latter may be shifted to connect the pipe 28a with the tank T by way of a pipe 28b, the pump P now sending its hydraulic pressure liquid to this passage 47 by way of a pipe 47a while the valve V connects the pipe 28a to a pipe 28b which discharges to the tank T from which the pump P draws its liquid. Now the hydraulic pressure acts on the bottom of the piston 46 and pushes the rod 35 upwardly until the bearing 43 reaches the upper limit of this travel. This upper limit is established by a motor drive unit base 48 fixed to the top of the extension 40 by cap screws 48a and mounting a motor 49 which through a reduction gear unit 50 serves to rotate the nut 44 through a sliding drive connection 51. The rod 35 is connected with the piston 23 as described below, so that the rod can pull up the piston and thereby the roll. With this operation, the hydraulic counterbalances 9 can also serve to lift the bearing 8 with which this particular mechanism is associated. Thus the upper roll is lifted. In the case of the lower adjustable roll, the bearing merely drops by gravity when the roll adjusting mechanism associated with it is correspondingly operated as just described.

The piston 23 must float slightly relative to the valve head 34 to effect the roll positioning action previously described. Therefore, to permit the rod 35 to pull up the piston 23, there is a lost-motion connection between the rod 35 and the piston 23, it being understood that by "lost-motion" is meant that the piston 23 can move a limited amount relative to the rod 35 and therefore the valve head 34 rigidly fixed to this rod 35. This lost-motion action is secured by forming the valve head 34 with a depending sleeve 52, the valve head having a bore and the rod 35 having a reduced diameter end extending through both the valve head and its sleeve 52. The bottom end of the rod 35 is threaded and has a nut 53 which through an interposed collar 54 jams the valve head and its sleeve tightly up against the bottom end of the unreduced portion of the rod 35. This collar 54 is formed with two or more grooves 55 which serve both to form a part of the passage for the hydraulic pressure liquid discharging from the cylinder 18, and also to accommodate at least one key 56 which fits in a corresponding groove in the chock 25. This prevents rotation of the rod 35 during rotation of the nut 44. The bore 32 formed in the chock is enlarged as required to accommodate the lowermost end of the rod 35 and its nut 53 and collar 54 and the outside of the diameter of the sleeve 52 is smaller than the inside diameter of the bore 29 as required for the passage of the discharging hydraulic pressure liquid. The space between the collar 54 and the piston's bottom should provide for a free flow of the discharging liquid so as not to affect the action of the control gap between the valve head 34 and its seat.

Restricted to the concept of roll positioning only, the nut 44 which engages the screw-threaded upper end of the rod 35 works like a screw-down mechanism with the important exception that the only stress involved is that imposed by the tension on the nut resulting from the relatively small net piston area of the top and bottom of the valve head 34 which is exposed to the operating hydraulic pressure in the cylinder 18. Therefore, for roll adjustment purposes, the motor 49 and the gearing in its gear box 50 through which the nut is turned, may be relatively small and very quick acting, because the operating torque of the nut 44 and the masses of the mechanical elements are very small as compared to a conventional screw-down mechanism.

It is to be noted that the rod 35 does not operate in compression as it does in the case of the conventional screw-down mechanism. Instead, this rod 35 is in tension. This is of substantial importance as explained below.

As previously mentioned, the frames 1 necessarily operate in tension as they do in any calender, rolling mill or the like. This introduces the unfortunately well known frame or housing spring problem. This is created by the fact that with high roll pressure the frames or housings, being necessarily elastic, stretch so as to interfere substantially with delicate roll positioning by any roll positioning mechanism heretofore known.

In the case of the present invention, the location of the roll bearing, or its position, is fixed by the rod 35 which adjusts the position of the valve head 34 whose upper and lower surface is exposed to the hydraulic pressure in the cylinder 18 in which there is the pressure providing the reaction to the roll-separating force involved. Since this rod 35 is in tension and is made of metal and is therefore elastic, it also stretches proportionally to the roll-separating force reaction pressure of the hydraulic liquid and therefore proportionally to the stretch of the frame or housing which carries the roll-separating force in tension. When the rod 35 stretches, the valve head 34 moves to a lower position repositioning the operating range of the piston 23 in a direction opposite to that in which the roll neck bearing, positioned by the mechanism, moves because of the frame or housing stretching.

With the above understood, it becomes apparent that by proper design the stretch of the valve head positioning rod 35 as well as that of other elements may be conditioned so that as the frame or housing stretches, the valve head 34 moves oppositely, or downwardly, with the result that the roll nip or pass being controlled by the mechanism, along with the companion mechanism at the other roll end, can be maintained essentially at a fixed roll separation distance.

In other words, the roll positioning adjusting mechanism of the present invention can provide a calender, rolling mill or the like with very high stiffness with the roll set acting as though they were held together positively and entirely free from any tendency to spring apart due to deflections or stretch of the roll frame under the stress of the working rolling pressure.

Another advantage of this new mechanism is that it is possible to provide a work rolling pass exerting a constant rolling pressure on the work, so that if the controlling work varies in thickness, for example, the resultant separating force remains the same. This is due to the very low torque required to turn the nut 44.

One manner in which this constant rolling pressure may be effected is shown by FIG. 4. Here, a pipe 57 connects the pressure existing in the pipe 28a, which is the same pressure as in the cylinder 18, with a pressure-responsive reversing motor control 58 which through wiring 59 controls the motor 49. This control may be represented as essentially comprising a pressure responsive unit associated with an electric reversing switch arranged so that when the pressure in the pipe 57 drops, the motor 49 is operated in a direction causing the nut 44 to screw the rod 35 in a downward direction, and when the pressure in the pipe 57 increases, the motor 49 is caused to operate in a reverse direction screwing the rod 35 upwardly. This pressure-responsive motor control may be conventionally constructed and should be adjustable to provide for the maintenance of varying pressures in the cylinder 18. When once adjusted, any variation in this pressure caused by a change in the control gap is immediately corrected by movement of the rod which, of course, adjusts the position of the valve head 34 and thereby the control gap existing between the bottom face of this valve head and the shoulder 31.

It is to be understood that with the maintenance of constant pressure, the nip or pass size varies, depending on the nature of the work being pressure rolled, but the actual rolling pressure exerted on the work is kept constant in value.

It is also desirable that a roll positioning device be provided with some means for permitting quick separation of the pressure-rolling rolls in case the maximum safe rolling pressure is exceeded for any reason. A conventional screw down does not offer this desirable feature. With the present invention this may be easily accomplished by connecting a pressure relief valve by a pipe 28b to the pipe 28a. The valve immediately blows off, or relieves the pressure, the moment the maximum safe operating pressure within the cylinder 18 is exceeded.

In the modification shown schematically by FIG. 6, a roll bearing 8a is positioned by a rod 35a having its upper end threaded and engaged by a nut 44a which is shouldered against shoulder 42a. The nut is fixed from rotating by bolting the nut to the frame 1b. The thrust force from the roll separating force is transmitted to the roll frame through the bearing 8a, valve seat 31a, rod 35a and nut shoulder 42a. The lower end 34a of rod 35a functions as a valve head seating against a valve seat 31a through which thrust is applied to the bearing 8a. Rotation of the rod 35a through a slide drive 51a by a motorized unit 49a translates the rod 35a up or down.

In this case the rod 35a works in compression like a conventional screw-down and all of the described parts should be massive enough to take the reaction of the full roll-separating force. The shoulder 42a carries the thrust. The torque required to turn the rod 35a would be very high but for the following:

The frame top 1b which provides the bores previously mentioned, as in the first example, forms a cylinder 18a having an inlet 28a for hydraulic pressure liquid and forming a closed end portion, with which the inlet 28a connects, and in which a piston 23a reciprocates. The rod 35a is drilled lengthwise to form a discharge passage 33a which connects through passages 33b formed between the nut 44a and rod 35a with a discharge outlet extension 33c. The cylinder 18a has an enlarged bore 30a so that the pressure in the cylinder 18a has full access to the valve seat 31a.

With this modified arrangement, the pressure on the rod 35a which can function in thrust as a conventional screw-down, may be relieved of thrust when its adjustment is necessary, by introducing hydraulic pressure liquid through the inlet 28a. This transfers the thrust from the rod 35a to the piston 23a, whereupon the nut 44a may be turned with very little torque. Alternately, the introduction of a continuous flow of hydraulic pressure liquid through the inlet 28a would place the piston 23a in action as before described, with the rod end 34a and the valve seat 31a functioning to provide a control gap for the continuous discharge of the liquid through the discharge passages 33a, 33b, and 33c so that the previously described effect is obtained with the piston 23a maintaining the position of the roll bearing 8a preselected by the location of the rod 35a.

Thus it can be seen that the continuous flow discharge of the hydraulic pressure liquid of the first example could be directed upwardly through the rod 35 by the provision of suitable passages.

In both examples, the motor required to locate the roll's position operates under a very low torque load so that very quick roll adjustment is possible. Therefore, in both examples the maintenance of a constant roll pressure by automatic means is practicable. In the first exmaple, which is the preferred form, there is the additional advantage of positive roll nip or pass size maintenance regardless of frame or housing stretch. Both examples provide freedom from hydraulic springiness or bounciness common to prior art hydraulic mechanisms. In the first example, rapid roll separation is possible either deliberately or by reason of the roll pressure exceeding a safe maximum.

What is claimed is:

1. Mechanism for relatively positioning adjustably interspaced work rolls cooperatively forming a pressure-rolling pass for traveling work, and including a cooperative cylinder and piston normal to and on the side of one roll opposite to said pass, a compression member connecting one end of this piston to said one roll, the cylinder having a closed end portion enclosing the other end of the piston, said end portion having an inlet for hydraulic pressure liquid, and a tension member interconnecting the cylinder and the other roll so that hydraulic pressure in the cylinder's closed end portion provides a reaction to the roll-separating force of the work; wherein the improvement comprises means for feeding a continuous flow of hydraulic pressure liquid to said inlet, means for permitting a continuous discharge flow of said liquid from the cylinder's said closed end portion, valve means for controlling said discharge flow and means responsive to relative movement of said piston in said cylinder for controlling said valve means to increase the hydraulic pressure in the cylinder's closed end portion when the piston moves inwardly with respect to the cylinder's closed end portion and to decrease the hydraulic pressure in the cylinder's closed end portion when the piston moves oppositely with respect thereto.

2. The mechanism of claim 1 having means responsive to the hydraulic pressure in the cylinder's said closed end portion for controlling said valve means so as to keep the hydraulic pressure in said closed end portion at a substantially constant value.

3. The mechanism of claim 1 in which said piston has a longitudinally extending opening forming a valve seat facing inwardly with respect to the cylinder's said closed end portion and providing at least partially said means for permitting said continuous discharge flow, a valve head for said seat and cooperatively with the latter forming said valve means, a positioning rod fixed to this valve head and extending longitudinally from said piston reciprocatively through the end of the cylinder's closed end portion, the latter having an opening for this rod and sealing means therefore preventing loss of hydraulic liquid around the rod, and means for adjustably holding this rod at longitudinally differing positions locating said valve head at corresponding positions relative to said cylinder and thereby forming said means responsive to movement of the piston with respect to the cylinder's said closed end portion and, in addition, adjustably locating the operating position of the piston and therefore the interspacing of said rolls forming said pass.

4. The mechanism of claim 1 in which a reciprocative rod extends through the ends of the piston's said closed end portion, said rod having a passage opening from the rod's inner end and the latter forming a valve head, thereby providing at least partially said means for permitting said continuous discharge flow, a valve seat connected to move with said piston and engageable by the rod's said inner end, thereby forming said valve means, a passage extending from the cylinder's said closed end portion to said valve seat, and means for adjustably holding said rod at longitudinally differing positions locating the rod's said inner end at corresponding positions and thereby forming said means responsive to movement of the piston with respect to the cylinder's said closed end portion and, in addition, adjustably locating the operating position of the piston and therefore the interspacing of said rolls forming said pass.

5. The mechanism of claim 3 in which said tension member elastically stretches appreciably in length under the stress of said roll-separating force and said hydraulic pressure reaction thereto, said valve head having a piston area exposed to the hydraulic liquid, providing said pressure, in a direction facing the end of the piston's said closed end portion and placing said positioning rod under tension between this valve head and said means for adjustably holding this rod, said rod elastically stretching under tension in a direction opposite to the stretch of said tension member and this rod being proportioned to thus stretch to a degree locating said valve head at positions relocating the piston's said operating position so as to substantially compensate for the elastic stretch of said tension member.

6. The mechanism of claim 3 having means responsive to the hydraulic pressure in the cylinder's said closed end portion for adjusting said means for holding said rod so as to keep said pressure at a substantially constant value and therefore correspondingly the work rolling pressure of said rolls.

7. The mechanism of claim 3 in which said means for adjustably holding said rod comprises a nut and screw drive, one of the nut and screw elements of said drive having means for rotatively holding it against longitudinal motion towards said piston but permitting opposite longitudinal motion and the other element being fixed nonrotatively to said rod, and means for rotating said rotatively held element to longitudinally adjust said rod, said valve head being exposed to the hydraulic pressure in the cylinder's said closed end portion and therefore tensioning said rod, means for terminating said continuous flow of hydraulic pressure liquid to said inlet to release said hydraulic pressure, and means for causing said opposite longitudinal motion of said rotative element of said drive when said hydraulic pressure is released, whereby to permit separation of said rolls.

8. The mechanism of claim 7 including a lost-motion connection means interconnecting said piston and rod so that the former can move in either direction a limited distance relative to said valve head but said rod connects with and moves said piston towards the end of the cylinder's said closed end portion when this rod is moved by said means for causing said opposite longitudinal motion of said rotative element of said drive.

9. The mechanism of claim 4 in which said means for adjustably holding said rod is a nut and screw drive strong enough to transmit all of said reaction to the roll-separating force of the work to said cylinder when its closed end portion is free from hydraulic pressure, the introduction of such pressure by said means for feeding a flow of hydraulic pressure liquid to the piston's said closed end portion relieving said drive from all or a portion of said reaction.

References Cited

UNITED STATES PATENTS

| | | | |
|---|---|---|---|
| 2,027,283 | 1/1936 | McFadden | 72—246 |
| 2,030,256 | 2/1936 | Hume | 68—258 |
| 2,030,257 | 2/1936 | Hume | 68—258 XR |
| 2,563,690 | 8/1951 | Nalon | 100—170 XR |
| 2,691,339 | 10/1954 | Edwards | 100—170 |
| 2,871,519 | 2/1959 | Flint et al. | 100—170 XR |
| 3,326,928 | 6/1967 | Kajiwara | 72—240 |

PETER FELDMAN, Primary Examiner

U.S. Cl. X.R.

68—258; 72—245; 100—47